Figure 3:
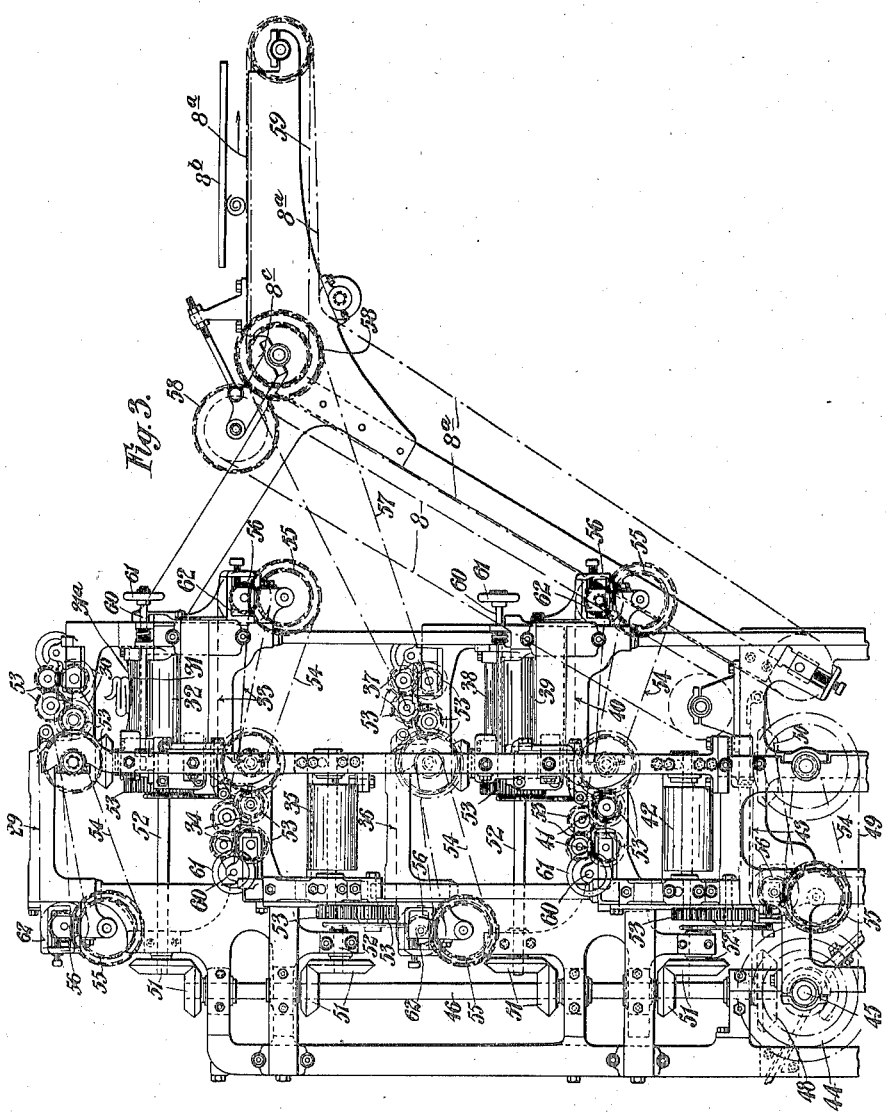

G. R. BAKER AND J. W. OWEN.
PROCESS OF BREAD MAKING.
APPLICATION FILED MAR. 28, 1917.
1,312,094.
Patented Aug. 5, 1919.
3 SHEETS—SHEET 1.
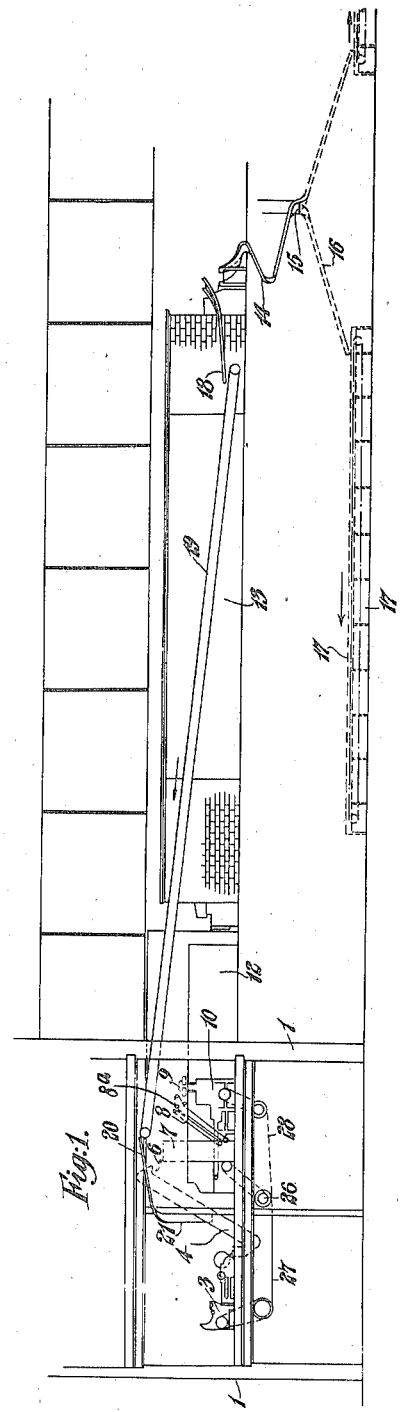
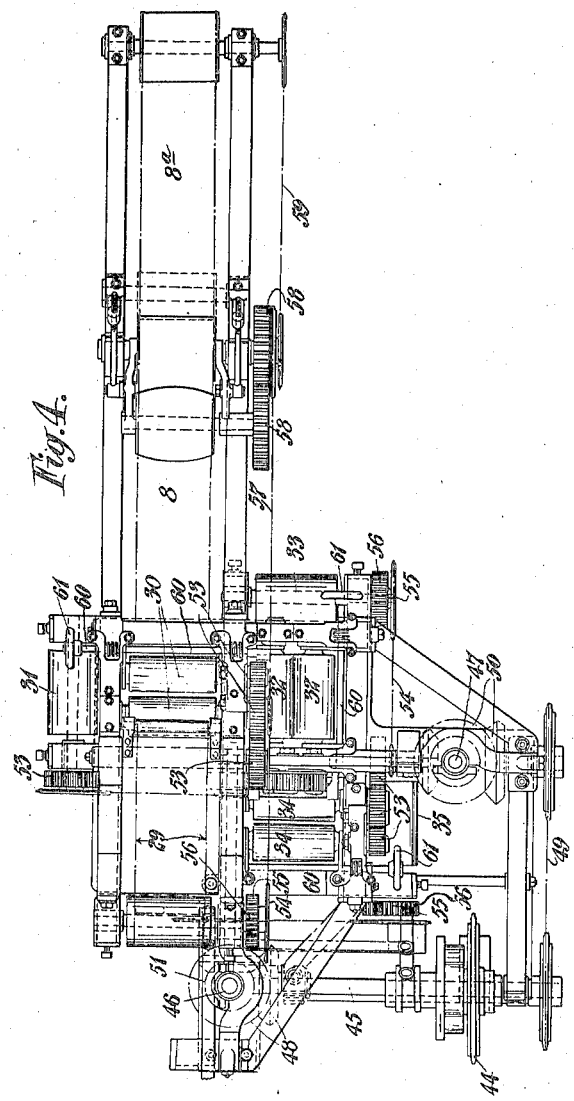
Inventors
George Ralph Baker
Joseph William Owen
by their Attorney

G. R. BAKER AND J. W. OWEN.
PROCESS OF BREAD MAKING.
APPLICATION FILED MAR. 28, 1917.
1,312,094.
Patented Aug. 5, 1919.
3 SHEETS—SHEET 2.
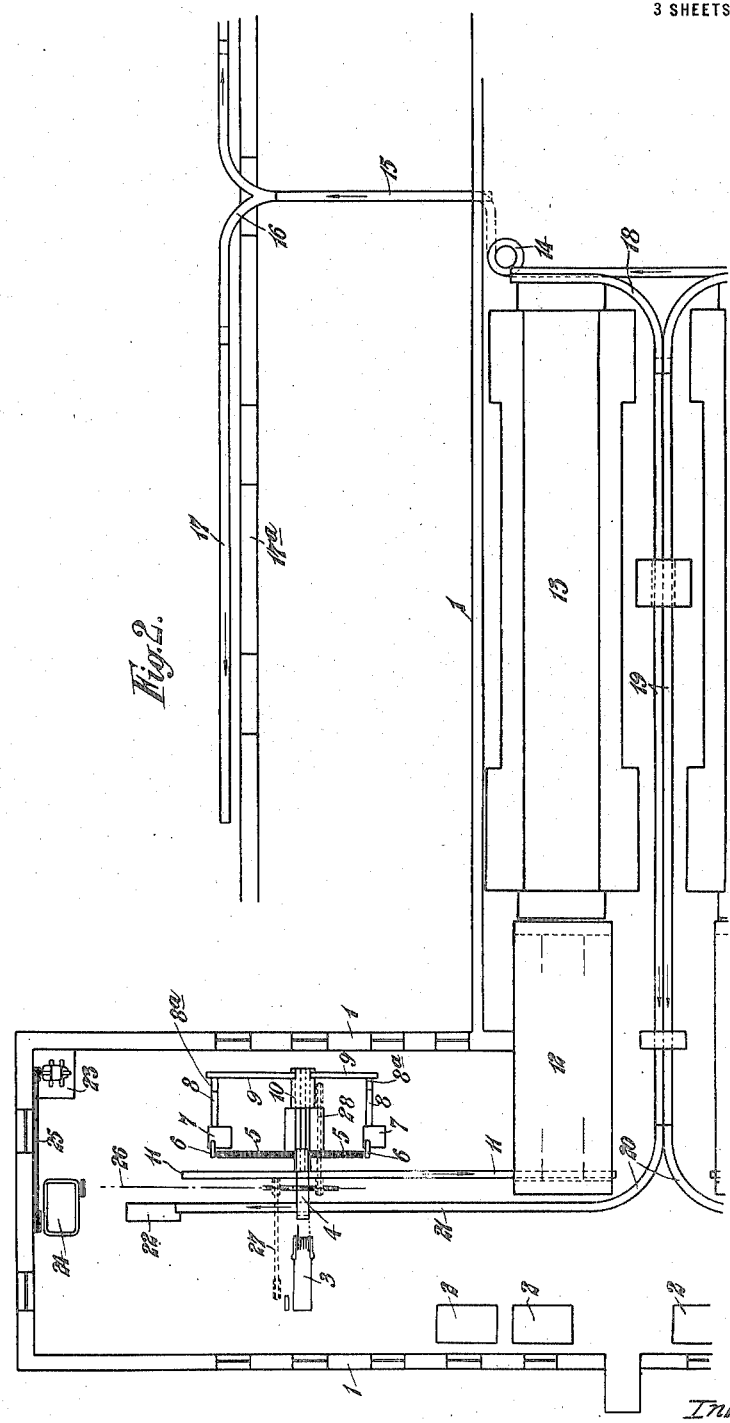
Inventors
George Ralph Baker.
Joseph William Owen
by their Attorney

UNITED STATES PATENT OFFICE.

GEORGE RALPH BAKER, OF LONDON, AND JOSEPH WILLIAM OWEN, OF PLYMOUTH, ENGLAND.

PROCESS OF BREAD-MAKING.

1,312,094.  Specification of Letters Patent.  Patented Aug. 5, 1919.

Application filed March 28, 1917. Serial No. 158,043.

*To all whom it may concern:*

Be it known that we, GEORGE RALPH BAKER, residing in London, England, and JOSEPH WILLIAM OWEN, residing in Plymouth, in the county of Devon, England, both subjects of the King of England, have invented certain new or Improved Processes of Bread-Making, of which the following is a specification.

This invention relates to a new or improved process of bread making, this process involving the repeated sheeting and folding of the dough which may be performed successively at right angles to that preceding, and wherein the usual primary and intermediate provings may be dispensed with, that is to say, the proving between the mixing and the dividing operations and between the dividing and the molding operations, the total process from the initial mixing of the dough to the placing in the oven being capable of performance in approximately one hour, though under certain conditions a longer period may be required and the result being a bread of very high quality.

By our improved process also we are enabled to use with satisfactory results a slacker dough than usual, which at the same time is easy to manipulate, and further advantages obtained are that a minimum of gas is given off from the dough during the process and a larger output of loaves per given quantity of flour results, besides which, qualities of the flour are preserved in the bread which might be wholly or partially destroyed by prolonged fermentation.

According to this invention we carry out our improved process as follows:—

The flour is mixed with yeast or any suitable fermenting agent in a kneading machine or by other known method and preferably also with a substance which will act to slightly acidify the same, such as cream of tartar, in the proportions of approximately ¼ to ½ per cent. by weight of flour and thereupon without any " proving ", the dough is directly divided in any appropriate or conventional type of dividing machine or apparatus.

The pieces of dough from said dividing machine or apparatus are then still without any proving, directly introduced to the first of a series or plurality of sheeting and folding devices each of which may consist of a pair of sheeting or gaging members such as rollers and a band or web below same intermittently moved. The pieces of dough are sheeted between said members and the sheet thus produced falls freely on to the web or band below and without the use of positive folding elements in a succession of folds, the number of which, for each piece, may be varied by adjusting the distance between the rollers or sheeting members, the closer the said members are placed together, the greater being the number of folds produced.

From the belt or band of said first sheeting and folding device the dough is passed directly to the sheeting members of a second similar device the dough being thereupon sheeted and folded at right angles to the direction of the first sheeting and folding and thence through a considerable number of said devices in succession, in which the sheeting and folding operation in each may take place at right angles to that in the preceding one. By this repeated sheeting and folding, which may for example take place from ten to twenty times, the dough is thoroughly refined by the setting up of a large number of fermentation centers evenly distributed throughout it, the result being a loaf of very fine and even texture.

After this treatment has taken place the desired number of times, the pieces of dough are finally brought to the required shape, by hand, or by mechanical means and are then proved in a suitable proving apparatus until the required fermentation has developed.

The said proving apparatus may be of the type commonly used in bakeries or may be mechanical in operation with or without automatic feeding and discharging devices; in either case it may be heated internally or externally by any suitable means such as gas or electrical heaters or by steam or hot water pipes in such a manner that the temperature of the prover may be controlled together with the degree of humidity of the atmosphere therein.

When the required amount of fermentation has been secured in the dough pieces they are fed directly into a suitable baking oven.

Apparatus suitable for carrying out the above process is illustrated in the accompanying drawings wherein Figure 1 is a diagrammatic elevation showing portions of a bakery plant; Fig. 2 is a diagrammatic plan view of said plant. Fig. 3 is an elevation of the machine for performing the successive sheeting and folding operations above mentioned and Fig. 4 is a plan view of said machine.

The general lay-out of the bakery plant will first be described followed by a detailed description of the sheeting and folding machine.

To first refer therefore to Figs. 1 and 2, 1 designates the walls of the building in which the plant is situated and which contains kneaders 2 from which the kneaded dough is transferred to a dividing and handling up machine 3, the divided pieces of dough being removed therefrom by means of an elevator 4 to two bucket conveyers 5 which convey said pieces in opposite directions to chutes 6 which transfer them to two sheeting and folding machines 7 the construction of which is hereinafter described and from which latter machines the sheeted or rolled out pieces pass upward between pairs of endless bands 8 and conveyers 8a and thence to two other conveyers 9 which transfer said pieces to a centrally disposed further sheeting and folding or molding machine 10. Having been treated in this latter the molded pieces of dough are inserted by hand into tins which are then placed on a conveyer 11 which transfers them to a prover 12 whence they pass directly into a traveling bread oven 13 and are baked. On completion of the baking process the loaves are removed by hand from the tins, the former being placed on a spiral slide 14 down which they pass to a conveyer 15, thence to a chute 16, and from the latter to a slot conveyer 17 in the bread room from which they may be removed to tables 17a to be subsequently dealt with as may be required. The emptied tins are placed on a chute 18 down which they slide on to a conveyer 19 which transfers them to another chute 20 from which they again pass to a still further gravity conveyer 21 which moves them to a bench 22 from which they may be again taken to receive fresh molded pieces from the molding machine 10. 23 designates an electric motor for driving the various machines or devices, 24 a reducing gear say of the "Reeves" type driven from the motor by the belt 25, the gear driving a main shaft 26 from which the dividing and handing up machine is driven by chain gear 27 and the molding machine by chain gear 28. Other chain gearing (not shown) may be driven off said main shaft for keeping the whole plant in synchronism.

It may be here remarked that all the devices or mechanisms above mentioned with the exception of the sheeting and folding machine 7 may be of any known or conventional construction and need no further description, the form of further sheeting and folding or molding machine 10 preferably used being of the kind disclosed in the specification of United States Patent No. 1,109,895 dated 8th September, 1914, and it should be here stated that the provision of the two sheeting and folding machines 7 mentioned is merely illustrative, since a single machine, or more than two thereof may be provided with corresponding modifications of the feed and discharge means therefor.

To now refer particularly to Figs. 3 and 4 of the drawings, these figures show the above mentioned sheeting and folding machine 7 in which the pieces of dough direct from the dividing and handing up machine are given a plurality of sheeting and folding treatments each at right angles to the preceding one, without the use of any positive folding elements, a said piece first being received from a chute 6 (Figs. 1 and 2) onto a feed band 29 which passes it to between a pair of rolls 30 at the top of the machine between which it is sheeted or gaged and from which it falls freely on to a web or band 31a below in a succession of folds produced by the gravity of the dough alone as shown in Fig. 3. The web may at the point where the dough is discharged onto same be supported by a table 31 the surface of which is preferably concave or dished to turn up the edges of the web at the point mentioned as shown at the top of Fig. 3. The web 31a then conveys the folded piece to another pair of rolls 32 disposed at right angles to the first pair 30, this latter pair of rolls again depositing the piece in a series of folds onto a web 33 which conveys it to other rolls 34 at right angles to the said rolls 32 and so on in succession through a pair of rolls and on to webs and through rolls 35, 36, 37, 38, 39, 40 and 41, 42 to the last or lowermost web 43. The sheeted and folded piece is fed from the web 43 to between the pair of belts 8, 8a by which it is conveyed upward, the belt 8a being deflected in a horizontal direction around the roll 8c, the piece being then carried by said belt to a further sheeting and folding or molding machine 10 of the construction hereinbefore referred to.

On said belt 8a the piece may be coiled by passing beneath a fixed flexible board or plate 8b in the known manner. Any convenient means for driving the rollers, webs and conveyers may be used but in the drawings the following dispositions are made:— From the main shaft 26 (Fig. 2) chain gear 44 drives a shaft 45 which latter drives two vertical shafts 46 and 47 the former through bevel gear 48 and the latter through chain 49 and bevel gear 50. From the shafts 46 and 47 the pairs of rollers 30, etc., are driven by means of bevel gears 51, shafts 52 and spur gears 53 and from said gearing the webs 29, 31, etc., are driven intermittently by chain 54 and interrupted spur gearing 55, 56. The bands 8, 8ᵃ are driven from one of the roller gearings through chain gear 57, 59 and spur gears 58.

Means for adjusting the distance between the pairs of rolls 30, etc., may be provided by mounting one of said rollers of a pair in sliding bearings and moving the latter by means of worm spindles 60 operated by hand wheels 61. Similarly also for adjusting the tension of the webs 29, 31, etc., one of the rollers carrying same may be mounted in adjustable bearings as shown at 62.

What we claim as our invention and desire to secure by Letters Patent of the United States is:—

1. A process of producing dough of high quality in a minimum period of time consisting in mixing the dough with a fermenting agent and also with an acidifying medium and then directly without proving sheeting and folding the dough a large number of times sufficient to thoroughly refine same by inducing throughout it a large number of evenly distributed fermentation centers.

2. A process of producing dough of high quality in a minimum period of time consisting in mixing the dough with a fermenting agent and also with an acidifying medium, and then directly without proving sheeting and folding the dough successively at right angles a large number of times sufficient to thoroughly refine same by inducing throughout it a large number of evenly distributed fermentation centers.

3. A process of producing bread of high quality in a minimum period of time consisting in mixing the dough with a fermenting agent, directly without proving sheeting and folding the dough a large number of times sufficient to thoroughly refine same by inducing therein a large number of evenly distributed fermentation centers, proving the dough, and baking the same.

4. A process of producing bread of high quality in a minimum period of time consisting in mixing the dough with a fermenting agent and also with an acidifying medium, dividing the dough into pieces, directly without proving sheeting and folding the pieces of dough a large number of times sufficient to induce throughout same a large number of evenly distributed fermentation centers, molding the dough into loaves, subjecting said loaves to a proving operation and baking the same.

5. A process of producing bread of high quality in a minimum period of time, consisting in mixing dough with a fermenting agent and also with an acidifying medium, dividing the dough into pieces, directly and without proving, sheeting and folding the pieces of dough successively in directions at right angles a large number of times sufficient to induce throughout same a large number of evenly distributed fermentation centers, the folding operations being performed by the gravity of the dough alone, molding the dough into loaves and baking the latter.

In witness whereof we have signed this specification in the presence of two witnesses.

GEORGE RALPH BAKER.
JOSEPH WILLIAM OWEN.

Witnesses as to Joseph William Owen:
B. V. WHEATON,
AUGUSTA STEPHENS.